Jan. 9, 1962 D. COHN 3,015,856
METHOD OF MOLDING DOLLS' HEADS
Filed Oct. 10, 1958 4 Sheets-Sheet 1

INVENTOR.
DAVID COHN
BY Clark+Ott
ATTORNEYS

Jan. 9, 1962 D. COHN 3,015,856
METHOD OF MOLDING DOLLS' HEADS
Filed Oct. 10, 1958 4 Sheets-Sheet 2

INVENTOR.
DAVID COHN
BY
Clark+Ott
ATTORNEYS

Jan. 9, 1962 D. COHN 3,015,856
METHOD OF MOLDING DOLLS' HEADS
Filed Oct. 10, 1958 4 Sheets-Sheet 3
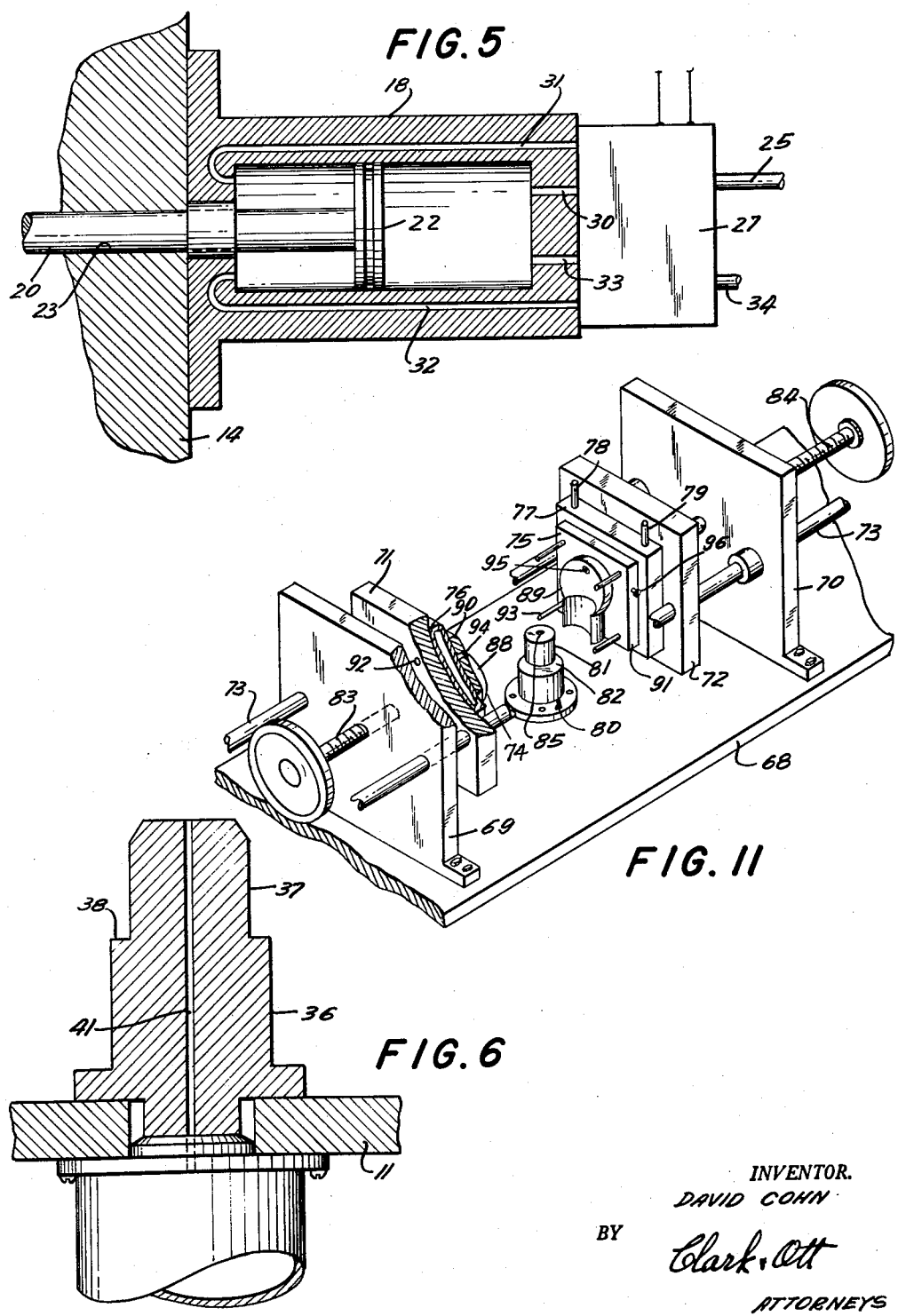
INVENTOR.
DAVID COHN
BY
Clark Ott
ATTORNEYS Jan. 9, 1962            D. COHN            3,015,856

METHOD OF MOLDING DOLLS' HEADS

Filed Oct. 10, 1958            4 Sheets-Sheet 4

INVENTOR.
DAVID COHN
BY
Clark+Ott
ATTORNEYS

3,015,856
METHOD OF MOLDING DOLLS' HEADS
David Cohn, Poundridge, N.Y., assignor to Model Plastic Corporation, White Plains, N.Y., a corporation of New York
Filed Oct. 10, 1958, Ser. No. 766,544
2 Claims. (Cl. 18—55)

This invention relates to a method for the production of hollow articles from tubular units of thermoplastic material.

The method comprehends the steps of heating a tubular unit of thermoplastic material to the flow temperature thereof, heating metal elements having heads to the flow temperature of the thermoplastic material, inserting the heated metal elements in fixed position in a confining cavity formed by hollow sections with the heads of the metal elements projecting into the confining cavity, moving the sections to closed relation with the heated tubular unit clamped therebetween and sealed at the top and bottom between said sections, admitting fluid under pressure into the portion of the tubular unit within the confining cavity to expand the said portion thereof against the inner faces of the sections and about the headed ends of the metal elements, separating the sections and removing the expanded tubular unit therefrom together with the metal elements embedded therein, cutting away the unexpanded portions of the tubular unit, slitting the portions of the wall of the expanded tubular unit about the inner peripheries of the heads of the embedded metal elements, and removing the metal elements together with the portions of the wall cut away to thereby provide sockets in the molded article opening outwardly and into the hollow interior thereof.

The invention also has for an object the production of dolls' heads by said method and for this purpose hollow mold sections are provided which are contoured on the inner faces thereof to form molded articles having the shape and configuration of dolls' heads. A heated tubular unit may be positioned on a supporting member between the hollow mold sections and the heated metal elements may be lifted and inserted in openings in one of the mold sections by employing a magnetized piece of metal. The mold sections are moved into abutting relation to clamp the heated tubular unit therebetween to thereby seal the unit at the top of the mold sections and about the supporting member. Fluid is admitted under pressure through an opening in the supporting member and into the portion of the tubular unit within the closed mold sections so as to expand the said portion of the tubular unit against the inner faces of the mold sections and about the headed ends of the metal elements. The mold sections are moved apart to free the expanded tubular unit together with the metal elements embedded therein. The unexpanded upper and lower portions of the tubular unit are then cut away and the portions of the wall of the expanded tubular unit about the inner peripheries of the heads of the embedded metal elements are cut away and the metal elements removed to provide sockets and eye openings in the molded dolls' heads for the reception of dolls' eyes.

The method may be carried out by an apparatus which includes reciprocatory plates on which are mounted hollow mold sections movable with the plates to closed and spaced apart relation and which clamp and seal the tubular unit therebetween when in closed relation and provide a confining space therein. Between the mold sections holding means is provided for supporting the heated tubular unit and against which the mold sections engage when in closed relation to seal the lower ends of the tubular unit. Means is also provided for preheating metal elements having enlarged heads which are insertable in one of the mold sections with the heads located within the confining space and which are embedded in the wall of the molded article with the expanding of the tubular unit against the inside face of the mold sections and about the headed ends of the preheated metal elements by fluid pressure forced therein through the aperture in the holding means. Movement of the plates to open relation frees the molded article for removal thereof together with the metal elements embedded therein.

With the foregoing and other objects in view, reference is now made to apparatus by which articles may be blow molded from preheated tubular units of thermoplastic material in accordance with the method.

In the drawings:

FIG. 5 is a fragmentary vertical sectional view taken approximately on line 5—5 of FIG. 1.

FIG. 6 is a fragmentary vertical sectional view taken approximately on line 6—6 of FIG. 2.

FIG. 11 is a perspective view of another form of apparatus for expanding tubular units of thermoplastic material in accordance with the method.

Figure 1:
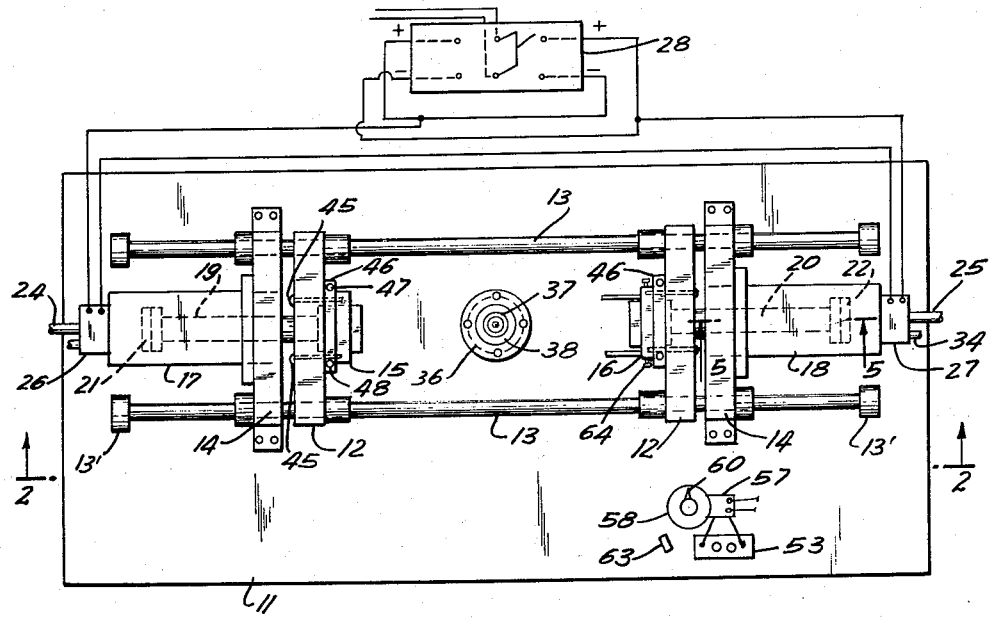
FIG. 1 is a top plan view of an apparatus for expanding tubular units of thermoplastic material in accordance with the method.
Figure 2:
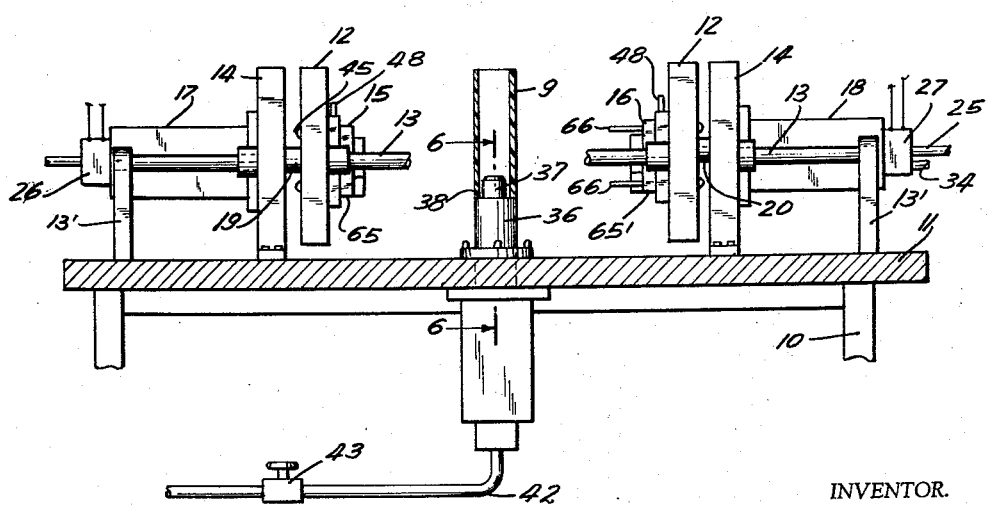
FIG. 2 is a side view thereof taken approximately on line 2—2 of FIG. 1.
Figure 3:
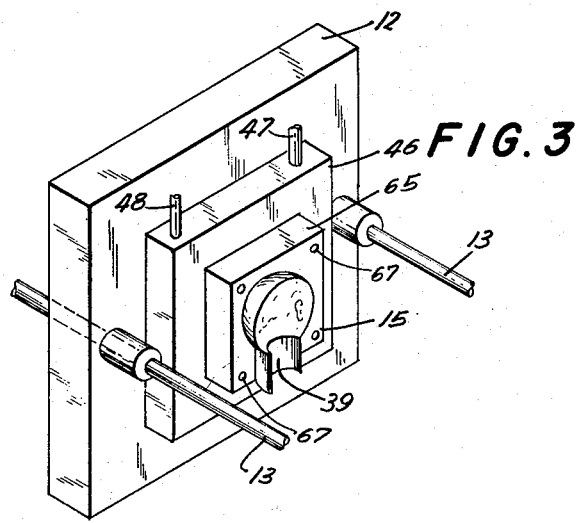
FIG. 3 is an enlarged perspective view of one of the movable plates together with a mold section.
Figure 4:
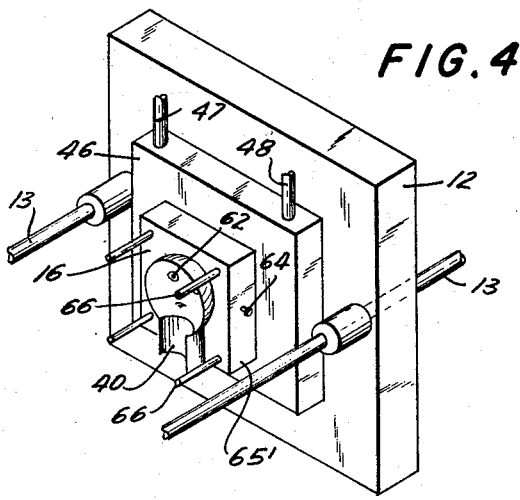
FIG. 4 is a perspective view of the other movable plate together with another mold section.

In carrying out the method to form hollow articles, use is made of tubular units 9 of thermoplastic material such as cellulose acetate, cellulose acetate butyrate, polyethylene, regenerative polystyrene, heat and shock resistant styrene, cellulose propionate, nylon, ethyl cellulose, vinyl chloride and other synthetic materials flowable under heat and pressure. The tubular units 9 are preheated in any desired manner to the flow temperature thereof which for cellulose acetate may be from 257° F. to 347° F. The ends of the tubular unit 9 are sealed and the portion thereof between the sealed ends is expanded within a confining space formed by hollow mold sections having the desired form and shape. Prior to the expanding of the tubular unit headed pins which have been preheated to the flow temperature of the thermoplastic material are inserted in openings in one of the mold sections so as to embed the same in the wall of the molded article. The molded article is removed from the confining space together with the metal elements embedded therein which may be removed by slitting the portion of the wall about the inner periphery of the embedded units and removing the metal elements to thereby produce wall forming sockets which open into the hollow article and through the wall thereof constituting sockets for the eyes of dolls when the method is employed for molding dolls' heads.

The heated tubular units 9 of thermoplastic material may be expanded in accordance with the method by an apparatus which consists of a supporting frame 10 having a bed 11 with two aligned plates 12 mounted for sliding movement toward and away from each other on guide rods 13. The rods 13 extend through fixed plates 14 which are secured to the bed 11 in alignment with the movable plates and with the ends of the rods anchored in abutments 13' at the ends of the bed.

The movable plates 12 are arranged between the fixed plates 14 and carry hollow mold sections 15 and 16 which are contoured on their inner faces to provide molded articles having the shape and configuration desired such as that of the dolls' heads. Fixedly mounted on the fixed plates 14 are cylinders 17 and 18 through which project shafts 19 and 20 having piston heads 21 and 22 arranged within the cylinders respectively and with the shafts protruding through openings in the inner ends thereof and through guide openings 23 in the fixed plates 14 with the inner ends of the shafts affixed to the movable plates 12. Means is provided for admitting fluid under pressure to the cylinders through conduits 24 and 25 for effecting simultaneous inward movement of the shafts to dispose the mold sections in closed relation and simultaneous outward movement of the shafts to space the mold sections apart. Mounted on the cylinders are solenoid valves 26 and 27 connected through the conduits 24 and 25 with a source of compressed fluid and with the solneoids connected with a source of current through a double throw double pole switch means 28 for closing the circuit to effect movement of the movable plates in unison in either direction. It will be understood that moving the switch means to one position closes the circuit to effect movement of the mold sections to closed relation and movement of the switch means to another position closes the circuit to effect movement of the mold sections to spaced apart relation. The cylinders are connected with the solenoid valves 26 and 27 respectively for admitting fluid thereto to move the piston inwardly and outwardly in accordance with the actuation of the solenoid valves by the movement of the switch means 28 as hereinbefore described. The cylinders are connected with the solenoid valves as illustrated in FIG. 5 of the drawings in which the ports of the solenoid valve 26 are connected with the cylinder 18 by two supply fluid passageways 30 and 31 opening into the ends of the cylinder and with two fluid discharge passageways 32 and 33 connected with the opposite ends of said cylinder. It will be understood that when the solenoid valve is moved to one position, the fluid passageway 30 will be open to admit fluid under pressure to the outer end of the cylinder for movement of the piston toward the inner end thereof and at the same time the fluid discharge passageway 32 will be open to discharge fluid from the inner end of the cylinder through the solenoid valve and through the discharge outlet 34. When the solenoid valve is moved to another position, the fluid passageways 31 will be open to admit fluid under pressure to the inner end of the cylinder for movement of the piston toward the outer end thereof and at the same time the fluid discharge passageway 33 will be open to discharge fluid from the outer end of the cylinder through the solenoid valve and through the discharge outlet 34.

Mounted on the bed 11 is a holding means for receiving heated tubular units 9 in upstanding relation thereon. The holding means consists of an upright metal member 36 having a cylindrical upper portion 37 and an annular shoulder 38 at the lower end of said cylindrical portion. The member 36 is fixed to the bed 11 medially between the mold sections with the cylindrical upper portion thereof disposed in alignment with semi-cylindrical cavities 39 and 40 formed in the lower portion of the mold sections. The said holding means is adapted to support a heated tubular unit 9 in upstanding relation on the shoulder 38 which unit is sealed at the top and about the cylindrical portion 37 with the closing of the mold sections. The portion of the heated tubular unit located within the confining space formed by the mold sections is then expanded by fluid pressure admitted to the tubular unit through an opening 41 in the holding means which is connected by a conduit 42 with a source of fluid under pressure and with valve means 43 for opening up and closing off the conduit as desired.

The mold sections 15 and 16 are removably mounted on the inner faces of the movable plate 12 by any desired means such as by screws 45 extending through the movable plates and through water jackets 46 with the inner ends of the screws anchored in the mold sections. The water jackets 46 have supply and return conduits 47 and 48 connected therewith which are joined to a source of cold water supply for the flow of water through the jackets to thereby maintain the mold sections at a temperature approximately that of the flow temperature of the thermoplastic material of the tubular units. The inner peripheral edge portions of the mold sections which abut when the sections are in closed relation are of tapered formation terminating in a sharp peripheral edge which permit of a narrow line contact continuously about the inner peripheral edges of the mold sections whereby the mold sections are air tight and effect a sealing action of the upper portion of the tubular unit as indicated at 49 in FIG. 9 of the drawings. The portions of the mold sections which form the semi-cylindrical cavities 39 and 40 surround the cylindrical upper portion 37 of the holding means to tightly clamp the lower portion of the tubular unit about said cylindrical upper portion to thereby seal the lower portion of the tubular unit and prevent the escape of the fluid pressure admitted through the conduit 42 for expanding the tubular unit.

Figure 7:
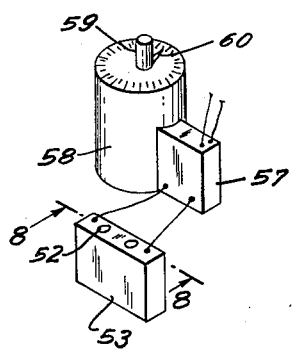
FIG. 7 is a perspective view of an apparatus for carrying out the step of heating the metal elements in accordance with the invention.
Figure 8:
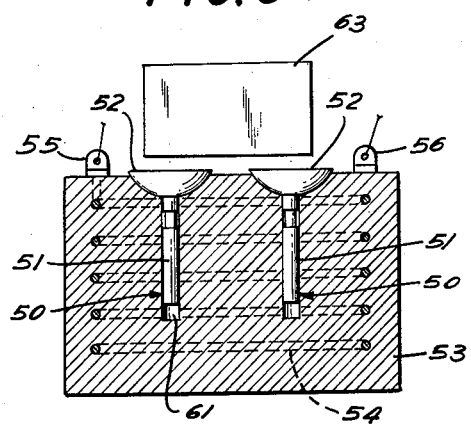
FIG. 8 is a sectional view taken approximately on line 8—8 of FIG. 7.

The portions of the heated tubular unit within the mold sections are expanded by the fluid pressure against the inner faces of the mold sections and about the inner ends of the preheated metal elements 50. When the metal elements 50 are used for producing eye sockets in dolls' heads, the same have shanks 51 provided with semi-spherical heads 52 to form the desired shape of the eye sockets. The metal elements 50 are preheated before inserting in the mold section to the flow temperature of the thermoplastic material of the tubular units. This may be carried out by means of the apparatus illustrated in FIGS. 7 and 8 of the drawings which includes a metal block 53 having a resistance element 54 embedded therein with terminals 55 and 56 adapted to be connected with a source of current supply through a juncture box 57 and a rheostat 58. The rheostat has a movable element 59 adapted to be set for heating the block 53 to the desired temperature. For this purpose the top of the rheostat is graduated in degrees whereby the element 59 may be moved with the pointer 60 indicating the temperature setting. The block 53 together with the juncture box and rheostat may be arranged on the bed of the apparatus as shown in FIG. 1 of the drawings for convenient use in heating the metal elements and for inserting the same in openings in the mold section. The block 53 is provided with bores 61 which open through the top thereof in which the metal elements are disposed for heating and when in heated condition may be conveniently removed from the block and inserted in openings 62 in the mold section 16 by the operator using a permanent magnet 63. The metal elements are releasably secured in the openings 62 in the mold section 16 by means of set screws 64 threadedly engaged in threaded openings in the sides of said mold section. When in position in the mold section, the semi-spherical heads 52 project into the mold cavity.

The mold sections 15 and 16 are formed with bases 65 and 65' respectively and in order to insure registration of the inner edges thereof when the same are in closed relation, the mold section 16 is provided with short rods 66 extending inwardly from the base thereof and which snugly and slidably fit into openings 67 in the base 65 of the mold section 15 to thereby guide said sections into closed relation.

Figure 9:
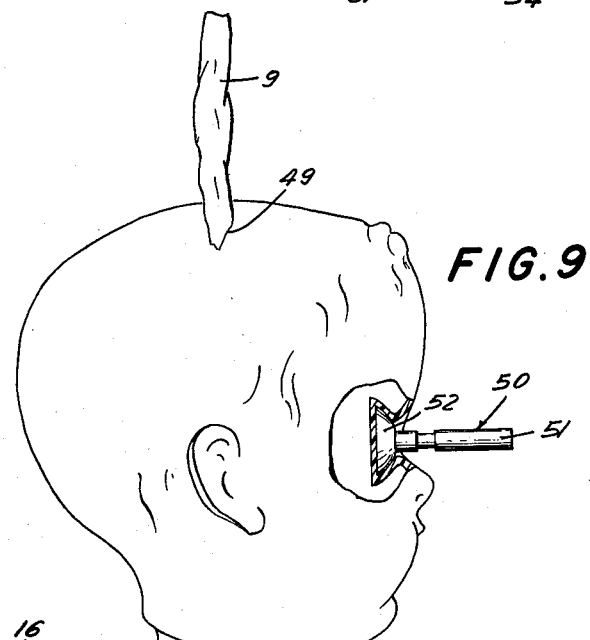
FIG. 9 is a view in elevation of a hollow doll's head as removed from the mold sections.

When dolls' heads are produced in accordance with the method, the molded article is in the form shown in FIG. 9 of the drawings with the metal elements 50 protruding therefrom. The portion of the tubular unit above the seal 49 may be cut away by any desired means such as by a knife and the portion thereof sealed about the cylindrical portion 37 of the holding means may be cut away along the line 49' by any desired manner such as by a knife. The metal elements 50 may be removed by cutting away the molded wall about the outer peripheral edge of the semi-spherical heads of said metal elements by any desired means such as by a knife inserted through the neck opening. Removing the metal elements 50 produces sockets within the doll's head which open into the interior thereof and through the face of the doll for receiving dolls' eyes.

Hollow articles may be produced in accordance with the method by use of the apparatus shown in FIG. 11 of the drawings which is arranged for manually moving mold sections into closed relation. This form of apparatus includes a base 68 on which are mounted fixed plates 69 and 70 and with movable plates 71 and 72 arranged therebetween and mounted for sliding movement on guide rods 73 which extend through the fixed plates 69 and 70 corresponding to the guide rods 13 in the form illustrated in FIGS. 1 to 4 inclusive of the drawings. The movable plates 71 and 72 removably carry mold sections 74 and 75 with water jackets 76 and 77 for receiving circulating water so as to maintain the mold sections from exceeding the flow temperature of the thermoplastic material during repeated use. The water jackets 76 and 77 have flexible conduits 78 and 79 connected with a source of cold water supply similar to the flexible conduits 47 and 48. Holding means 80 is provided similar to the holding means in the form of the apparatus shown in FIGS. 1 to 4 inclusive of the drawings and which includes a cylindrical upper portion 81 having an annular shoulder 82 at the lower end thereof on which a heated tubular unit 9 of thermoplastic material is adapted to be disposed in upstanding relation intermediate the mold sections 74 and 75. The mold sections are moved to closed relation to clamp the tubular unit therebetween by means of manually turning the screws 83 and 84 to seal the top of the tubular unit between the mold sections and the bottom portion thereof about the upper portion 81 of the holding means. Fluid pressure such as air or gas is admitted to the portion of the tubular element within the confining space formed by the mold sections through an opening 85 extending upwardly through the holding means 80 for expanding the said portion of the tubular unit against the inner faces of the mold sections and about metal elements 50 so as to form sockets in the molded articles as hereinbefore described. The mold sections 74 and 75 are similar to the mold sections 15 and 16 and taper inwardly into narrow edges 88 and 89 at their inner peripheries respectively which edges abut when the sections are in closed relation. The screws 83 and 84 project through threaded openings in the fixed plates 69 and 70 respectively with the inner ends of the screws swivelly connected with the movable plates 71 and 72 whereby the movable plates have straight translatory movement with the turning of the screws.

The mold sections 74 and 75 have bases 90 and 91 respectively which are releasably attached to the movable plates 71 and 72 respectively by means of screws 92 which extend through the movable plates and through the water jackets 76 and 77 with the inner ends of the screws threadedly secured in the mold sections. The mold section 75 is provided with short rods 93 projecting inwardly from the base thereof and which is adapted to snugly and slidably engage in openings 94 in the base 90 of the mold section 74 to insure that the narrow edges 88 and 89 of the sections abut when in closed relation. The mold section 75 is provided with openings 95 on the inner face thereof adapted to receive the shanks of the metal elements 50 for producing sockets in the expanded article. Set screws 96 are threadedly engaged in openings in the sides of the base 91 of the mold section 75 for releasably securing the metal elements 50 in position during the molding operation.

Figure 10:
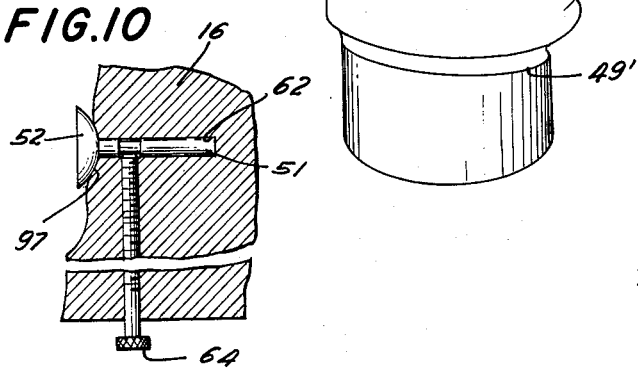
FIG. 10 is a fragmentary horizontal sectional view taken partly through one of the mold sections showing one of the metal elements in position therein.

It will be understood that the mold sections 16 and 75 is the two forms of the apparatus have concave depressions in which the semi-spherical heads of the metal elements 50 are positioned with the inner ends of the metal elements protruding into the mold cavity. As illustrated in FIG. 10 of the drawings showing a fragmentary sectional view of the mold section 16 which is typical of the mold section 75, the same is provided with a concave depression 97 with the opening 62 for receiving the shank of one of the metal elements 50 opening centrally therethrough. This provides means by which the eye openings are formed in the expanded article when the metal elements 50 are removed as hereinbefore described.

While the preferred forms of the apparatus have been shown and described herein for carrying out several of the steps of the method, it is to be understood that the apparatus is not so limited but shall cover and include any and all modifications thereof which may be utilized in performing the method. The method may be performed by manually sealing the ends of the heated thermoplastic tubular unit 9 and expanding the portion thereof between the sealed ends within a confined space to partake of the form and shape thereof by air pressure admitted through one of the sealed ends.

What is claimed is:

1. A method of molding hollow dolls' heads having inwardly directed substantially semi-spherical rims extending peripherally about the eye openings in the heads from tubular units of thermoplastic material which have been preheated to approximately the flow temperature of said material, said method consisting of heating metal elements having substantially semi-spherical heads to the flow temperature of said thermoplastic material, affixing said metal elements to the wall of a mold for a doll's head with the heads of the metal elements projecting into the mold cavity and disposed at the locations for the eye openings respectively in a doll's head, maintaining said mold at a temperature approximately that of the flow temperature of the material of said preheated units, providing a tubular unit of thermoplastic material, heating said tubular unit to approximately the flow temperature thereof; expanding said heated tubular unit against the inner face of said mold and about the inwardly projecting portions of the heads of said metal elements, removing the expanded tubular unit from the mold with the heads of the metal elements embedded therein, cutting the portions of the expanded wall about the inner peripheries of said heads, and removing the metal elements and the portions of the wall cut away to thereby provide rims on the molded doll's head extending inwardly about eye openings therein.

2. A method of molding hollow doll's heads having inwardly directed substantially semi-spherical rims extending peripherally about the eye openings in the heads from heated thermoplastic material, said method consisting of heating metal elements having substantially semi-spherical heads to the flow temperature of said thermoplastic material; affixing said metal elements to the wall of a mold for a doll's head with the heads of the metal elements projecting into the mold cavity and disposed at the locations for the eye openings respectively in a doll's head, maintaining said mold at elevated temperature, providing a tubular unit of thermoplastic material, heating said tubular unit to approximately the flow temperature thereof; expanding said heated hollow unit against the inner face of said mold and about the inwardly projecting portions of the heads of said metal elements to form a hollow doll's head closed at the top and having an open neck at the lower end thereof, removing the expanded thermoplastic material from the mold with the heads of the metal elements embedded therein, cutting the portions of the expanded wall about the inner peripheries of said metal heads, and removing the metal elements and the portions of the wall cut away from within the doll's head through the neck opening to thereby provide rims on the molded doll's head extending inwardly about eye openings therein.

References Cited in the file of this patent

UNITED STATES PATENTS

| | | |
|---|---|---|
| 892,702 | Wyman | July 7, 1908 |
| 1,052,081 | Miltner | Feb. 4, 1913 |
| 2,203,072 | Albright | June 4, 1940 |
| 2,262,612 | Kopitke | Nov. 11, 1941 |
| 2,322,858 | Limbert et al. | June 29, 1943 |
| 2,539,513 | Jenett | Jan. 30, 1951 |
| 2,763,031 | Rekettye | Sept. 18, 1956 |
| 2,890,483 | Soubier | June 16, 1959 |
| 2,967,330 | Tommarchi | Jan. 10, 1961 |

FOREIGN PATENTS

| | | |
|---|---|---|
| 203,385 | Australia | May 31, 1956 |
| 479,798 | France | Feb. 5, 1916 |
| 1,105,529 | France | July 6, 1955 |